United States Patent
Budach et al.

(10) Patent No.: US 7,513,196 B2
(45) Date of Patent: Apr. 7, 2009

(54) DEVICES FOR CONTROLLING AT LEAST ONE REGISTER IN A PRINTING MACHINE

(75) Inventors: Stefan Arthur Budach, Detmold (DE); Volker Lohweg, Bielefeld (DE); Bernd Rüdiger Stöber, Rheda-Wiedenbrück (DE); Harald Heinrich Willeke, Paderborn (DE)

(73) Assignee: Koenig & Bauer Aktiengesellschaft, Wurzburg (DE)

( * ) Notice: Subject to any disclaimer, the term of this patent is extended or adjusted under 35 U.S.C. 154(b) by 362 days.

(21) Appl. No.: 10/554,927

(22) PCT Filed: Apr. 30, 2004

(86) PCT No.: PCT/EP2004/050658

§ 371 (c)(1), (2), (4) Date: Oct. 31, 2005

(87) PCT Pub. No.: WO2004/096546

PCT Pub. Date: Nov. 11, 2004

(65) Prior Publication Data

US 2006/0207452 A1 Sep. 21, 2006

(30) Foreign Application Priority Data

May 2, 2003 (DE) ................. 103 19 770

(51) Int. Cl.
*B41F 1/34* (2006.01)
*B41F 21/12* (2006.01)
*B41F 21/14* (2006.01)
*B41F 3/58* (2006.01)
*B41L 1/02* (2006.01)

(52) U.S. Cl. ....................... 101/485; 101/248
(58) Field of Classification Search ................. 101/248, 101/481, 486, 485
See application file for complete search history.

(56) References Cited

U.S. PATENT DOCUMENTS

| | | | |
|---|---|---|---|
| 5,181,257 A * | 1/1993 | Steiner et al. ............... | 382/162 |
| 5,689,425 A * | 11/1997 | Sainio et al. ................ | 700/124 |
| 5,724,437 A | 3/1998 | Bucher et al. | |
| 6,050,192 A | 4/2000 | Kipphan et al. | |
| 6,108,436 A * | 8/2000 | Jansen et al. ................ | 382/112 |
| 6,129,015 A * | 10/2000 | Dewey ........................ | 101/211 |
| 6,332,397 B1 | 12/2001 | Bolza-Schunemann et al. | |
| 6,647,874 B1 | 11/2003 | Siegl et al. | |
| 6,796,240 B2 * | 9/2004 | Sainio et al. ................ | 101/485 |
| 6,810,813 B2 * | 11/2004 | Chretinat et al. ............ | 101/485 |
| 7,040,232 B2 * | 5/2006 | Van Holten et al. ......... | 101/484 |
| 2003/0005841 A1 | 1/2003 | Riepenhoff | |

FOREIGN PATENT DOCUMENTS

| | | |
|---|---|---|
| DE | 43 21 177 A1 | 1/1995 |
| DE | 101 31 934 A1 | 1/2003 |
| EP | 0 598 490 A1 | 5/1994 |
| EP | 0 882 588 A1 | 12/1998 |
| EP | 1 384 580 A1 | 1/2004 |
| WO | WO 95/31333 | 11/1995 |

* cited by examiner

*Primary Examiner*—Anthony H Nguyen
*Assistant Examiner*—Leo T Hinze
(74) *Attorney, Agent, or Firm*—Jones, Tullar & Cooper, P.C.

(57) ABSTRACT

At least one register and an ink density are controlled in a printing machine having at least one printing unit which includes a forme cylinder, a transfer cylinder, and a counter-pressure cylinder. An image sensor records an image from a print substrate, which is imprinted with ink, inside the printing unit, and sends data correlated to that image to an evaluation unit. The data for the last printed image is compared with prior data and in response, the evaluation unit generates a command that is directed to an actuator for controlling the supply of ink. The image sensor is oriented towards the print substrate and detects the entire width of the printed substrate, which width is transverse to a direction of substrate conveyance. The evaluation unit generates the actuating command to control the supply of ink based on data from the image sensor and taken over the entire width of the substrate. The evaluation unit also controls register, based on this data. The forme cylinder has a separate drive which can be controlled separately or that can be regulated by the counter-pressure cylinder assigned to it.

39 Claims, 1 Drawing Sheet

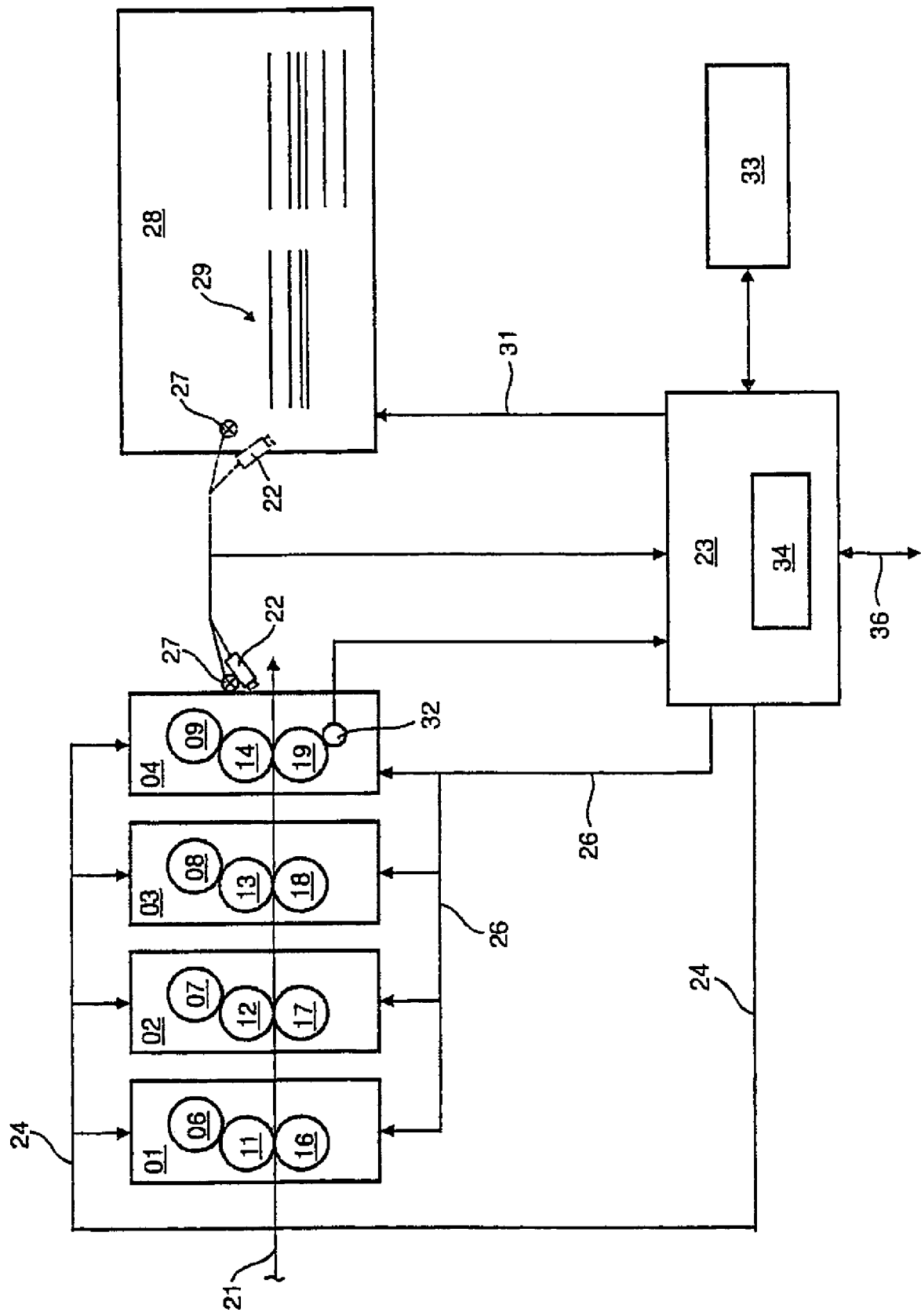

DEVICES FOR CONTROLLING AT LEAST ONE REGISTER IN A PRINTING MACHINE

CROSS-REFERENCE TO RELATED APPLICATIONS

This application is the U.S. national phase, under 35 USC 371, of PCT/EP2004/050658, filed Apr. 30, 2004; published as WO 2004/096546 A1 on Nov. 11, 2004, and claiming priority to DE 103 19 770.2, filed May 2, 2003, the disclosures of which are expressly incorporated herein by reference.

FIELD OF THE INVENTION

The present invention is directed to devices for regulating at least one register in a printing press.

BACKGROUND OF THE INVENTION

A device for parallel image inspection and color regulation of a printed product, which is produced in a printing press with at least one printing group, is known from DE 43 21 177 A1. An image detection arrangement is provided, which forwards image data from the printed product to a computer arrangement. The image detection arrangement consists of one or of several measuring modules, each of which scans a defined image area of the printed product, and of at least one associated receiving device, which creates the image data and which preferably is spatially separated from the measuring modules. The measuring modules and the at least one receiving device are connected with each other by at least one image conductor. A register sensor is also provided, and by the use of which, a register measurement can be performed at the imprinted printed product.

A color registration system for a printing press is known from EP 0 598 490 A1. A computer, with a camera or with a group of cameras, determines an erroneous alignment of colors of a printed product by comparing an actual image with a stored reference image, and, by the use of a printing control, aligns longitudinal, transverse and rotary positions of cylinders of a printing press in relation to a web, which web is moved through the printing press and is to be imprinted. The alignment is done, in such a way that the cylinders create a multi-color image with colors which are correctly aligned with each other.

A device and a method for the register-maintaining matching of printing cylinders of a web-fed rotary printing press is known from EP 0 882 588 A1. A first cylinder, which is imprinting one side of the web, is driven by a first motor, and a second cylinder, which is also imprinting the same side of the web, is driven by a second motor. The angular position of the second cylinder is matched by a regulator to maintain registration with the first cylinder. Register markings, which are imprinted on the web by the cylinders, are recorded by a sensor that is arranged downstream of the last cylinder in the production direction, which sensor may be, for example, a CCD camera. The register markings are evaluated as guide values for the regulator by the use of characteristic lines.

SUMMARY OF THE INVENTION

The object of the present invention is directed to providing devices for regulating at least one register in a printing press.

In accordance with the present invention, the object is attained by the provision of a printing press having at least one printing group with at least one forme cylinder, one transfer cylinder and one counter-pressure cylinder. An image sensor records an image of an imprinted substrate which has been printed in color. That image is evaluated in an evaluating unit. The evaluating unit generates an actuating signal to an actuating drive mechanism for regulating the register. The date provided to the evaluating unit is compared to data from a previously recorded image. The evaluation unit separates the image into its color components. Each forme cylinder has its own separate, independently controlled drive motor.

The advantages which can be attained by the present invention reside, in particular, in that it is possible, by providing images of the entire imprinting substrate width, to simultaneously obtain several data, for use in regulating the printing process, in a single evaluating unit. Also, separate types of sensors, with associated separate evaluating units, are not required for the various regulating paths in the printing press. Instead, the image sensor alone provides the data which is required for several parameters which are relevant to the printing process in the printing press and which can be influenced by control systems, such as adjusting the supply of ink or dampening agent, or the registration or registers, for example. This has advantageous effects on the costs for setting up and for maintaining the regulating system, as well as on the speed of reaction, such as, for example, in the case of detected deviations from the regulation. The above-mentioned parameters, which are relevant to the printing process, can simultaneously be controlled by a single regulating device having an image sensor and only one evaluating unit. The parameters can be corrected, if needed, which correction, because of the rapid intervention and regulating possibilities it provides, contributes to keeping the amount of waste in the printing process low and to the assurance of a high production quality over the entire printing process. By the use of the integral detection and the evaluation of the data in a single evaluating unit or computing device, the logging of the data, and the documentation of the quality of the printed products going hand-in-hand with it, as well as statistic analyses regarding the printing process, are made easier. This is because of the omission of interface problems which otherwise would have to be solved. An image of every produced printed piece is recorded, a check of individual pieces takes place, not only a spot check. Accordingly, a 100% check is accomplished during the printing process, so that printed copies, that are lacking in quality, can be removed or at least can be marked. Separate register markings, test fields or print control strips, which are applied to the imprinting substrate in addition to the actual printed image, are not required for regulating the color density of a color applied to the imprinting substrate by the printing press, or for checking that the register of the printed image is maintained. This is advantageous, because for one, such register markings require additional space on the material to be imprinted. Those register markings also only provide an indirect reference to the actual position of the color components, with respect to each other, which color components, in their totality, constitute the printed image.

BRIEF DESCRIPTION OF THE DRAWING

A preferred embodiment of the present invention is represented in the sole drawing FIGURE and will be described in greater detail in what follows.

DESCRIPTION OF THE PREFERRED EMBODIMENT

In a greatly simplified representation, and by way of example, the sole drawing FIGURE shows four aligned printing groups 01, 02, 03, 04 of an offset rotary printing press. Each of the printing groups includes a forme cylinder 06, 07, 08, 09, a transfer cylinder 11, 12, 13, 14, and a counter-pressure cylinder 16, 17, 18, 19. Every counter-pressure cylinder 16, 17, 18, 19 is preferably also embodied as a transfer cylinder, for use in producing printed products, which are imprinted on both sides, and thus works together with a forme cylinder, which is not specifically represented, that is assigned to it. An imprinting substrate 21, such as, for example, a printing sheet 21 or a web 21 of material, and preferably a paper web 21, is passed between the transfer cylinder 11, 12, 13, 14 and the counter-pressure cylinder 16, 17, 18, 19 in the course of the printing process and is imprinted with at least one printed image. It is immaterial, for purposes of the present invention, whether the printing groups 01, 02, 03, 04 are arranged in such a way that the imprinting substrate is conducted horizontally or vertically through the printing press.

An image sensor 22, such as, for example, a color camera 22, and preferably a digital semiconductor camera 22, which is provided with at least one CCD chip, is preferably arranged at the outlet of the last printing group 04 in a transport direction of the imprinting substrate 21 through the printing press. An image-taking area of the image sensor 22 is preferably directed immediately and directly onto the imprinting substrate 21. An image-taking area of the image sensor 22 takes in at least the entire width of the imprinting substrate 21, wherein this entire width of the imprinting substrate 21 extends transversely to the transport direction of substrate 21 through the printing press. Thus, the image sensor 22 detects an image of an entire width of the imprinted paper web 21, which image can be electronically evaluated, and wherein at least one printed image has been applied to the imprinting substrate 21 along the width of the paper web 21. The image sensor 22 is embodied, for example, as an area camera 22.

The image sensor 22 transmits data, which is correlated with the recorded image to a suitable evaluating unit 23, which, in particular, may be a program-controlled electronic computer arrangement 23, which computer 23 is arranged, for example, in a control console that is a part of the printing press. Parameters that are relevant to the printing process can now be checked by the use of an analysis which is performed in the evaluating unit 23 and, if required, these parameters can be corrected automatically, so to speak, by the use of programs which are run in the evaluating unit 23. The evaluation and correction of all of the parameters which are relevant to the printing process, takes place practically simultaneously by the use of the same evaluating unit 23. In particular, the image which is detected by the image sensor 22 in the course of the running production of the printing press, and which is transferred, in the form of a data flow, to the evaluating unit 23 is evaluated to determine whether the printed image, which was actually recorded as the picture and which was evaluated, shows a change in, for example, the shading value in comparison with a previously recorded and evaluated printed image, such as, in particular, an increase in the shading value. In other words, an actually recorded image is checked during the running process by comparison with a reference image. If the result of the check is a detection of a change in the shading value, which change is, as a rule, a technically unavoidable increase in the shading value, the metering and/or the supply of ink to the printing press is changed by the use of at least one first actuating command emanating from the evaluating unit 23. The at least one first activating command is conducted via a data line 24 and acts on at least one of the printing groups 01, 02, 03, 04. The effect is that the shading change becomes minimal by the control of the application of ink following the actually checked image. After the regulation of the color density, which is performed following the change in metering and/or supply of ink, the color impression of an image following the actually recorded picture of a printed image again corresponds better to a previously taken picture of a printed image, such as, a reference image. The control and the regulation of the shading change are important for keeping the color balance, or the gray balance, and therefore also for keeping the color impression of the produced printed products, as constant as possible, typically within permissible tolerance limits, which constitutes an important quality feature in connection with printed products.

The data flow, that is generated from the recording of the printed image and that is transmitted to the evaluating unit 23, is employed in the same way for checking the maintenance of the registration of the printed image applied to the imprinting substrate 21, and in particular, is used for checking and, if required, for the correction of a color registration of a printed image which is produced by multi-color printing. At least one register, which preferably is adjustable by the use of a motor, is provided in the printing press, and may be, for example, a circumferential register or a lateral register. This register can, if required, be a diagonal shifting device for shifting at least one of the forme cylinders 06, 07, 08, 09, with respect to the transfer cylinder 11, 12, 13, 14 that is assigned to it. As a function of this check, the register is regulated by the use of the at least one actuating command that is emanating from the evaluating unit 23, which transmitted via a data line 26 and which acts on at least one of the printing groups 01, 02, 03, 04 to the effect that the greatest possible registration accuracy results for a printed image following the recordation of the evaluated image. Setting or adjustment of the registers is thus calculated by the evaluating unit 23 based on the image data which was made available to it by the image sensor 22 of the evaluating unit 23. It is also possible, by the proper setting or adjustment of the lateral registration, to counteract a transverse stretching which is caused by fan-out. This transverse stretching occurs, in particular, in printing presses having a so-called eight-tower structure of their printing groups.

Preferably, the printing press is embodied without shafts. In such a printing press, the forme cylinders 06, 07, 08, 09 preferably each have individual drive mechanisms, which are mechanically decoupled from the drive mechanisms for the counter-pressure cylinders 16, 17, 18, 19. Accordingly, the phase relation or the angular relation of the forme cylinders 06, 07, 08, 09, with respect to the counter-pressure cylinders 16, 17, 18, 19, can be changed by an appropriate control or regulation, preferably of the drive mechanisms of the forme cylinders 06, 07, 08, 09, whenever an evaluation of the image of the imprinting substrate 21, by use of the image sensor 22, makes this appear necessary. The entire image content of the imprinting substrate 21, not just individual, locally limited image elements of that imprinting substrate 21, such as the reference markers, for example, or the like, therefore affects the control or the regulation of the printing group, and in particular the control or the regulation of the drive mechanisms of the forme cylinders 06, 07, 08, 09.

An actuating command, which is generated by the evaluating unit 23, on the basis of the image contents of the picture taken of the printed image, acts on a control device or on a regulating device of an electric motor, which electric motor is preferably a position-controlled one, and which is utilized for the rotatory driving, during printing, of at least one of the forme cylinders 06, 07, 08, 09, the transfer cylinder 11, 12, 13, 14 assigned to it, or the counter-pressure cylinder 16, 17, 18, 19. In this way, the drive mechanism of the forme cylinder 06, 07, 08, 09, in particular, or of the transfer cylinder 11, 12, 13,

14 that is assigned to this forme cylinder 06, 07, 08, 09, in one of the printing groups 01, 02, 03, 04 of the printing press can be controlled or regulated, preferably by electrical signals. Such control is accomplished independently of a control of the drive mechanism of the forme cylinder 06, 07, 08, 09, or of the transfer cylinder 11, 12, 13, 14 assigned to this forme cylinder 06, 07, 08, 09, in another one of the printing groups 01, 02, 03, 04 of the printing press. In particular, by use of such control, it is possible to set the mutual angular relation or the phase relation of the forme cylinders 06, 07, 08, 09 or of their associated transfer cylinders 11, 12, 13, 14, which are involved in the printing of the printed products, or in forming the printed image, and which are arranged in different printing groups 01, 02, 03, 04 of the printing press. By use of the associated control device or regulating device, such as, for example, the evaluating unit 23, it is possible to maintain a registration which is suitable for producing the printed product. The electric motor of the forme cylinder 06, 07, 08, 09 is preferably arranged coaxially with respect to the axis of the forme cylinder 06, 07, 08, 09. The rotor of the motor is preferably rigidly connected with a journal of the shaft of the forme cylinder 06, 07, 08, 09 in the manner described in DE 43 22 744 A1. The counter-pressure cylinders 16, 17, 18, 19, which are arranged in the various printing groups 01, 02, 03, 04 of the printing press can, in a manner such as is described in EP 0 812 683 A1, for example, be mechanically connected with each other by a train of gear wheels, for example, and can have a common drive mechanism, for example. However, the forme cylinder 06, 07, 08, 09, or the associated transfer cylinder 11, 12, 13, 14, remain disconnected with regard to their drive mechanisms, from their associated counter-pressure cylinder 16, 17, 18, 19. A coupling, such as, for example, by the use of gear wheels in engagement with each other, can exist between the forme cylinder 06, 07, 08, 09, and the transfer cylinder 11, 12, 13, 14 which is assigned to it, so that the forme cylinder 06, 07, 08, 09, and the transfer cylinder 11, 12, 13, 14 which is assigned to it, are driven by the same drive mechanism. The control device or the regulating device of the drive mechanisms of at least the forme cylinders 06, 07, 08, 09 is integrated in the evaluating unit 23, for example.

The control or the regulation of the phase relation or of the angular relation of the forme cylinders 06, 07, 08, 09 with respect to the counter-pressure cylinders 16, 17, 18, 19, takes place with respect to a fixed reference setting, so that the forme cylinder 06, 07, 08, 09 can have a leading relation or a trailing relation with respect to the counter-pressure cylinder 16, 17, 18, 19 assigned to it. The relation of the rotation of the forme cylinder 06, 07, 08, 09 and the counter-pressure cylinder 16, 17, 18, 19 which is assigned to it, is set as a function of the image content of the image recorded by the image sensor 22, and is also updated by the control device or by the regulating device of their drive mechanisms. It is possible, in the same way, to control or to regulate the phase relation or the angular relation of forme cylinders 06, 07, 08, 09, which are arranged downstream of each other in the printing process, in respect to a fixed reference setting, which control or regulation is of particular importance in connection with multi-color printing of printed matter that is printed according to colors in printing groups 01, 02, 03, 04 of the printing press, which printing groups are arranged one behind the other. If it becomes apparent from an evaluation of the picture of the printed image, which printed image preferably has several colors, that a correction is required of one color used in one of the printing groups 01, 02, 03, 04, the evaluation unit 23 issues its actuating command, which counteracts the detected interference effects, to the respective printing group 01, 02, 03, 04.

If the actuating drives, which are to be regulated by the evaluating unit 23, by the issuance of actuating commands, such as, for example, the actuating drives for regulating the supply of ink or of the dampening agent, as well as the drive mechanisms for regulating the circumferential register or the lateral register, are connected to a data network which is connected with the evaluating unit 23, the data lines 24, 26, which are provided for transmitting the first and second actuating commands, are preferably realized by the data network.

The checking of a shading value change occurring during the printing process, and the check for maintaining registration are performed in the evaluating unit 23 by the use of parallel data processing, and are advantageously performed simultaneously. These two checks are preferably performed continuously during the running printing process, and in particular advantageously at the end of the printing process and also for each individual, produced printed copy.

Initially, the check for maintaining registration relates to a congruent agreement of the position of the printed image or of the printed area between recto and perfecting printing, or between the top and the underside when producing printing products imprinted on both sides. The check also includes, for example, a check of the register, such as the check of the intended accuracy which individual partial colors have when printed on top of each other during multi-color printing. The registration accuracy, as well as the register accuracy, both play an important role in multi-color printing.

An illuminating device 27, such as, for example, a flash lamp 27, is advantageously assigned to the image sensor 22. Brief light flashes which are emanating from the flash lamp 27 make rapidly progressing movement actions, such as the printing process represents, appear to stand still by the performance of a stroboscopic method, and in this way make the imprinted substrate image observable to the human eye. With a sheet-fed printing press in particular, the recording of the printed image, that is performed by the image sensor, can also take place in, or at a delivery device 28 of the printing press, which is shown in the drawing FIGURE by a dashed representation of the image sensor 22 and the associated illuminating device 27 as a possible option for recording the printed image downstream of the last printing group 04 of the respective printed side, or at the end of the printing press. By an appropriate selection of the image sensor 22, and possibly also of the associated illuminating device 27, it is possible to extend the recording of the image into a virtually non-visible range, such as, for example, into the infrared or the ultraviolet range, or displace it into them. As an alternative to the preferred utilization of an area camera 22 with a flash lamp 27, the employment of a line camera with a permanent illuminating device is also possible.

Since every printed copy is preferably subjected to a check, a trend can be recognized, in the continuing printing process, or during continued printing, toward a shading value change and well as in the maintenance of the registration of sequentially produced printed copies. Depending on the value of their shading and/or their associated registration, which is detected during the running printing process, the printed copies can be classified into groups of different quality stages and can be marked as waste copies when they are exceeding a permissible tolerance limit. Waste copies can be specifically removed by the evaluating unit 23 or, particularly in connection with a sheet-fed printing press, can at least be placed on a separate deposit stack 29 in the delivery device 28. To this end, at least one third actuating command, such as, for example, a waste signal, is issued by the evaluating unit 23 which is evaluating the image and is conducted over a data line 31 to at least one actuating drive that is acting on at least one arrangement for transporting the imprinted substrate 21 and for sorting the flow of copies.

To synchronize the frequency at which the recording of images on the imprinted substrate 21 takes place, with the transport speed of the imprinted substrate 21, such as, for example, the speed of the paper web 21, an angle encoder 32 has been installed in at least one of the printing groups 01, 02, 03, 04, and preferably in that printing group 01, 02, 03, 04 in or at which the recording of the images, by the operation of the image sensor 22 takes place. The operating angle encoder 32 has a fixed ratio with respect to the number of revolutions of that one of the transfer cylinders 11, 12, 13, 14 at which the image sensor 22 records the images. The angle encoder 32 provides its output signal to the evaluating unit 23 and/or also to the image sensor 22. Among other things, the output signal of the angle encoder 32 is employed as the trigger for the flash lamp 27.

The image that is recorded by the image sensor 22 and which is conducted, in the form of a data flow, to the evaluating unit 23, is preferably displayed on a monitor of an input and output unit 33, which is connected with the evaluating unit 23 and which performs a bidirectional data exchange. The input and output unit 33 also provides correction options for at least one of the above-mentioned regulating devices in that it makes possible a manual input and/or the triggering of at least one actuating command.

The evaluating unit 23 has a memory device 34, which is used, among other things, for the storage of recorded image sequences, as well as for the storage of data which are useful for logging and for the simultaneous documentation of the quality of the printed products, as well as for conducting statistical analyses of the printing process. It is advantageous if the evaluating unit 23 can make the data which are evaluated and/or stored in it available to a company network by an appropriate connector 36.

For a comparison, which is performed by the evaluating unit 23, of data, which is correlated with an image actually recorded in the course of the running production of the printing press, with data from a previously generated image, the data from the previously recorded image can be correlated with an image which is recorded in a pre-printing stage that is arranged upstream of the printing press. A data processing arrangement of the pre-printing stage, which is not specifically represented, is connected with the evaluating unit 23 and provides the data of the previously generated image to the evaluating unit 23. In this way, the data of the previously generated image is generated alternatively or in addition to the data which is correlated with an image recorded by the image sensor 22 and are made available to the evaluating unit 23. For comparison with data obtained in the running production of the previously imprinted images, data from the pre-printing stage, and which is correlated with the printed image, constitute the better reference data for the control or regulation of the color register.

The device in accordance with the present invention allows a register regulation and a color regulation on the basis of an analysis of the same image recorded with the image sensor 22. The picture of the printed image is evaluated with regard to different parameters which are relevant to the printing process in a single evaluating unit 23, as well as simultaneously undergoing an inspection of the printed image for judging the quality of the printed matter.

In this case, a register measurement in the printed image is the basis for the register regulation. After all of the colors which are required for the printed image have been imprinted, the entire printed image is recorded by the camera or image sensor 22, preferably at the outlet of the printing press. A dissection of the recorded printed image takes place in the evaluating unit 23, preferably into the various color components CMYK which are customary in printing technology, as well as an analysis of suitable portions of the printed image and a relative position determination of a color component, with respect to a reference color component, by the use of correlation methods with a previously recorded or obtained printed reference image.

The reference image is obtained, for example, either from the pre-printing stage, which has the advantage that the reference image is already available in the individual color components, or a reference image, such as, for example, a printed sheet containing the printed image and obtained from a proof of the printed image, is used for the evaluation. This reference image must still also be separated into the color components. This reference sheet is recorded after the printed image has been manually adjusted once in such a way that all of the printed printing colors are correctly positioned in relation to each other and, in this way, a proper color register has been set. This printed reference image, which is obtained in this way, can be stored for later repeat orders. In case of a repeated order, this previously recorded reference image can be accessed. By assessing the stored printed reference image, it is also possible for the evaluating unit 23 to set the color register automatically without manual intervention which, in case of a repeat order, leads to a further reduction in waste.

Characteristic and suitable portions of the printed reference image are selected, by the use of which, the position of the individual color components with respect to the reference color component, is determined. This is the so-called desired position for the subsequent register comparison. This reference image, including the color components and the desired position, is stored in the memory device 34, for example. The selection of the suitable printed image portion can take place either manually by the operator or automatically by the evaluating unit 23, such as, for example, by pre-setting the desired position. Areas in which the printing ink to be measured dominates or appears exclusively are suitable printed image portions with regard to the register measurement.

Each printed image is recorded during the running printing process, or during a continuous printing process, by use of the camera system, and is separated into the color components CMYK. Now, the position of the individual color components within the previously selected suitable printed image portions is determined. This takes place by a comparison of the printed image with the color components from the printed reference image, such as, for example, by the use of a correlation method, and in particular by a cross-correlation method. It is possible, by use of the correlation method, to determine the position of the color components within approximately 1 pixel of the camera resolution. If a stationary register offset is repeatedly determined for each printed sheet, a high degree of accuracy of the measured value is assured by the suppression of stochastic scattering.

The determination of the position of the individual color components takes place, in the web running direction, in accordance with the longitudinal register, and takes place, in the transverse direction in respect to the web running direction, in accordance with the lateral register. The position differences, which are obtained in this way, are converted by the evaluating unit 23 into actuating commands and are transmitted as correction signals to the adjusting system, such as, for example, the drive mechanisms.

In the field of offset printing, special colors are not mixed with the standard colors, typically the scale colors CMYK, but are printed separately. Therefore, special colors are also separately measured. First, it is necessary to determine the areas in which special colors are to be printed. Now, their own suitable areas are fixed for each special color, in which areas the position of the color component is determined in the same way as was done for the scale colors CMYK, or the standard colors. The further procedure for register regulation, in connection with special colors, is identical to the previously described procedure for standard colors.

While a preferred embodiment of devices for controlling at least one register in a printing machine, in accordance with the present invention, have been set forth fully and completely hereinabove, it will be apparent to one of skill in the art that various changes in, for example, the specific type of substrate being printed, the structure of the delivery device, and the like could be made without departing from the true spirit and scope of the present invention which is accordingly to be limited only by the appended claims.

What is claimed is:

1. A device for regulating at least one register in a printing press comprising:
   at least first and second printing groups;
   at least one forme cylinder, one transfer cylinder and one counter-pressure cylinder in each of said at least first and second printing groups, said at least first and second printing groups being adapted to each print one color of a multiple color printed image on an imprinting substrate being printed in multiple colors in said at least first and second printing groups and travelling in a substrate direction of travel;
   an image sensor, said image sensor being usable to record a picture of said multiple color printed image of an entire width of said imprinting substrate extending transversely to said substrate direction of travel;
   an evaluating unit, usable to receive said picture of said entire width of said multiple color printed image recorded during a running production of said printing press and to compare multiple parameters of said picture with a previously recorded multiple color printed reference picture, and to separate said picture of said multiple color printed image and said reference picture each into separate color components and to perform a relative position determination of each of said separate color components of said picture of said printed image with respect to each of said separate color components of said previously recorded multiple color printed reference picture;
   a forme cylinder drive mechanism for each of said at least first and second printing groups and adapted to be controlled separately from a drive mechanism for said counter-pressure cylinder assigned to each said forme cylinder;
   an actuator for each said forme cylinder drive mechanism, said evaluation unit being adapted to generate a separate actuating command to each said forme cylinder drive mechanism actuator to selectively regulate a register of each respective one of said forme cylinders in response to said relative position determination of each of said color components of said picture of said multiple color image with respect to each of said color components of said previously recorded multiple color printed reference picture as provided by said image sensor; and
   a pre-printing stage located upstream, in said direction of travel of said substrate, said printing press, said previously recorded multiple color printed reference picture being formed in said pre-printing stage, said reference picture having proper registration of said multiple color image.

2. The device of claim 1 wherein said evaluating unit performs said relative position determination by a correlation method.

3. The device of claim 1 wherein said evaluating unit performs said relative position determination by a cross-correlation method.

4. The device of claim 1 wherein said relative position determination is performed several times.

5. The device of claim 1 wherein said register of each said forme cylinder is one of a circumferential register, a lateral register, and a diagonal shifting of each said forme cylinder with respect to said transfer cylinder associated with said forme cylinder.

6. The device of claim 1 wherein each said actuator regulates one of a phase position and an angular relation of its one of said at least first and second forme cylinders.

7. The device of claim 1 further including a company network and a connection between said evaluating unit and said company network.

8. The device of claim 1 further including an input and output unit adapted to provide correction options for said actuating command, said evaluating unit being in a bi-directional data exchange with said input and output unit.

9. The device of claim 8 further including a monitor in said input and output unit and adapted to display said recorded image.

10. The device of claim 1 further including a memory device in said evaluating unit and adapted to store sequences of said recorded image.

11. The device of claim 1 wherein said image sensor is located in an outlet of a last one of said at least first and second printing groups.

12. The device of claim 1 further including a delivery device for said printing press and wherein said image sensor is located at said delivery device.

13. The device of claim 1 wherein said evaluating unit checks at least one of a shading change and a registration maintenance during said running production of said printing press.

14. The device of claim 13 wherein said check is performed on each printed copy in said printing press.

15. The device of claim 1 wherein said evaluating unit classifies checked printed copies into groups of different quality.

16. The device of claim 1 wherein said evaluating unit is adapted to store data for use in determining quality of printed products.

17. The device of claim 1 further including an angle encoder installed on said at least one printing group and adapted to synchronize a frequency of recording of said images with a transport speed of said imprinting substrate.

18. The device of claim 17 wherein said angle encoder is installed in said printing group having said image sensor.

19. The device of claim 17 wherein said angle encoder transmits an output signal to said evaluating unit.

20. The device of claim 1 wherein said evaluating unit is adapted to change at least one register in said printing press to obtain color registration accuracy.

21. The device of claim 1 wherein each said forme cylinder of each of said at least first and second printing groups is controlled independently of said forme cylinder of another of said at least first and second printing groups.

22. The device of claim 21 wherein said evaluating unit is adapted to set one of mutual angular relation and phase relation of each said forme cylinder involved in printing said color image in said imprinting substrate.

23. The device of claim 1 wherein each said forme cylinder drive mechanism is coaxial with a shaft of said forme cylinder.

24. The device of claim 1 wherein said drive mechanism for each said forme cylinder is rigidly connected with a shaft of each said forme cylinder.

25. The device of claim 1 wherein said counter-pressure cylinders in said at least first and second printing groups are mechanically connected.

26. The device of claim 25 further wherein said counter-pressure cylinders in said at least first and second printing groups have a common drive mechanism.

27. The device of claim 25 further including a drive mechanism for said counter-pressure cylinders and being separate from a drive mechanism for said forme cylinders and said transfer cylinders of said at least first and second printing groups.

28. The device of claim 1 further wherein each said forme cylinder drive mechanism drives said transfer cylinder associated with each forme cylinder of said at least first and second printing groups.

29. The device of claim 1 wherein said evaluating unit evaluates suitable portions of a special color image different from standard colors of a colored image.

30. The device of claim 1 wherein said evaluating unit stores said printed images in a memory device.

31. The device of claim 30 wherein said printed images are stored in said memory device at a desired position.

32. A device for controlling register and color density in a printing press comprising:
- at least first and second printing groups each having at least one forme cylinder, one transfer cylinder and one counter-pressure cylinder, said at least first and second printing groups imprinting a multiple color printed image on an imprinting substrate being printed in said at least first and second printing groups and traveling in a substrate direction of travel during a running production of said printing press;
- an image sensor, said image sensor being usable to record a picture of said multiple color printed image of an entire width of said imprinting substrate transverse to said substrate direction of travel;
- an evaluating unit usable to receive said picture of said entire width of said multiple color printed image recorded during said running production of said printing press and to compare multiple parameters of said picture with a previously generated multiple color printed picture and to separate each of said running production multiple color printed picture and said previously generated multiple color printed reference picture into separate color components, said evaluating unit further performing a relative positional determination of each of said color components of said running production multiple color picture in relation to said color components of said previously generated multiple color printed reference picture;
- an ink supply to each of said at least first and second printing groups, each said ink supply having an ink supply drive mechanism;
- a register regulatory drive mechanism for at least one of said at least first and second printing groups; and
- means in said evaluating unit for converting differences detected by said relative positional determination of each of said color components between said running production multiple color printed picture and said previously generated multiple color printed reference picture in one of a substrate transport direction and a direction transverse to said transport direction into actuating commands for each said ink supply drive mechanism for said at least first and second printing groups and for said register regulatory drive mechanism for at least one of said at least first and second printing groups.

33. The device of claim 32 further including a forme cylinder drive mechanism for each of said at least first and second printing groups and adapted to be controlled separately from a drive mechanism for said counter-pressure cylinder assigned to each said forme cylinder.

34. The device of claim 32 further including a data network connected to said evaluating unit, said drive mechanisms being correlated to said data network.

35. The device of claim 32 wherein said printing press applies at least one printed image to said imprinting substrate.

36. The device of claim 32 wherein said regulation takes place simultaneously with an inspection of said printed image.

37. The device of claim 32 further including at least one of an imprinting substrate transport device and an imprinting substrate marking device and means in said evaluating unit for issuing an actuating command to said at least one of said transport device and said marking device when said relative positional determination exceeds a permissible tolerance limit.

38. The device of claim 32 further including means changing said ink supply to at least one of said at least first and second printing groups using said evaluating unit in response to a shading change exceeding a permissible tolerance limit.

39. The device of claim 32 further including a pre-printing device located upstream, in a direction of travel of said imprinting substrate, said previously generated multiple color printed picture being received from said pre-printing device.

* * * * *